United States Patent
Fox

(10) Patent No.: US 6,724,325 B2
(45) Date of Patent: Apr. 20, 2004

(54) IMAGE PROCESSING AND ENCODING TECHNIQUES

(75) Inventor: Simon Richard Fox, Heathmont (AU)

(73) Assignee: Dynamic Digital Depth Research Pty LTD, Bentley (AU)

( * ) Notice: Subject to any disclaimer, the term of this patent is extended or adjusted under 35 U.S.C. 154(b) by 4 days.

(21) Appl. No.: 09/908,506

(22) Filed: Jul. 18, 2001

(65) Prior Publication Data
US 2002/0041703 A1 Apr. 11, 2002

(30) Foreign Application Priority Data
Jul. 19, 2000 (AU) .............................. PQ8871

(51) Int. Cl.[7] .............................................. H03M 7/38
(52) U.S. Cl. .............................. 341/51; 341/50; 348/42
(58) Field of Search ..................... 341/50, 51; 348/42, 348/43, 59, 49, 413.1; 375/240, 240.23

(56) References Cited

U.S. PATENT DOCUMENTS

| 4,658,291 | A | * | 4/1987 | Morishita | 348/43 |
| 4,951,140 | A | * | 8/1990 | Ueno et al. | 348/413.1 |
| 5,193,000 | A | * | 3/1993 | Lipton et al. | 348/43 |
| 5,541,642 | A | * | 7/1996 | Ashbey | 348/59 |
| 5,619,256 | A | * | 4/1997 | Haskell et al. | 348/43 |
| 5,633,682 | A | * | 5/1997 | Tahara | 375/240.23 |
| 5,652,616 | A | * | 7/1997 | Chen et al. | 348/43 |
| 5,874,987 | A | * | 2/1999 | Itoh | 348/49 |
| 6,111,596 | A | * | 8/2000 | Haskell et al. | 348/42 |
| 6,144,701 | A | * | 11/2000 | Chiang et al. | 375/240 |

FOREIGN PATENT DOCUMENTS

| JP | 408046908 A | * | 2/1996 |
| JP | 41108111 A | * | 1/1999 |

* cited by examiner

Primary Examiner—Jean Jeanglaude
(74) Attorney, Agent, or Firm—Banner & Witcoff, Ltd.

(57) ABSTRACT

A method of compressing a stereoscopic image, using entropy coding, wherein a model derived from a first eye image is used to encode an image for a second eye, and wherein the model is determined from a first eye difference image of a first frame and a second frame of the first eye image; and a second eye difference image of a first frame and a second frame of the second eye image, will be encoded using the model.

37 Claims, 5 Drawing Sheets

The Encoding Process

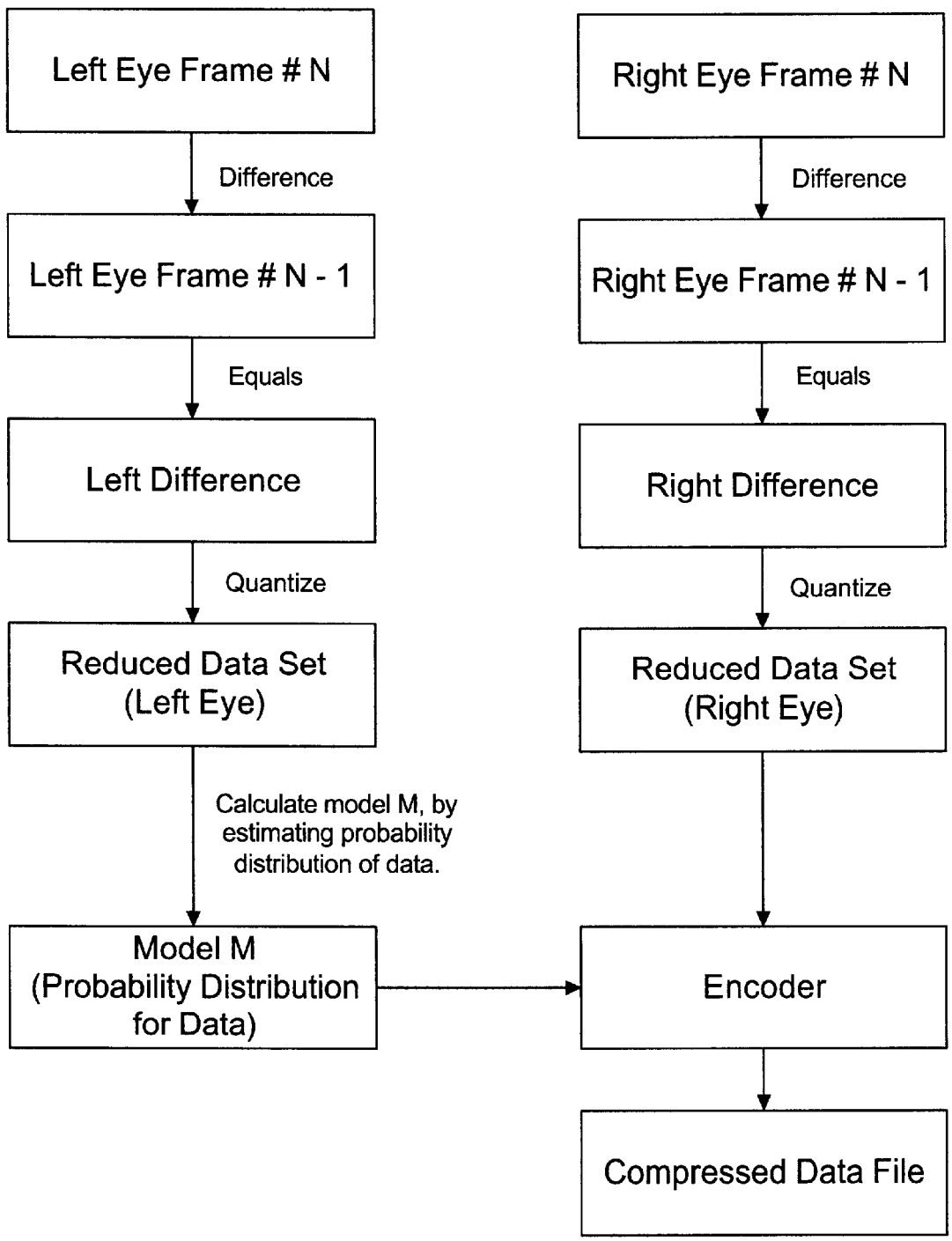
Figure 1: The Encoding Process

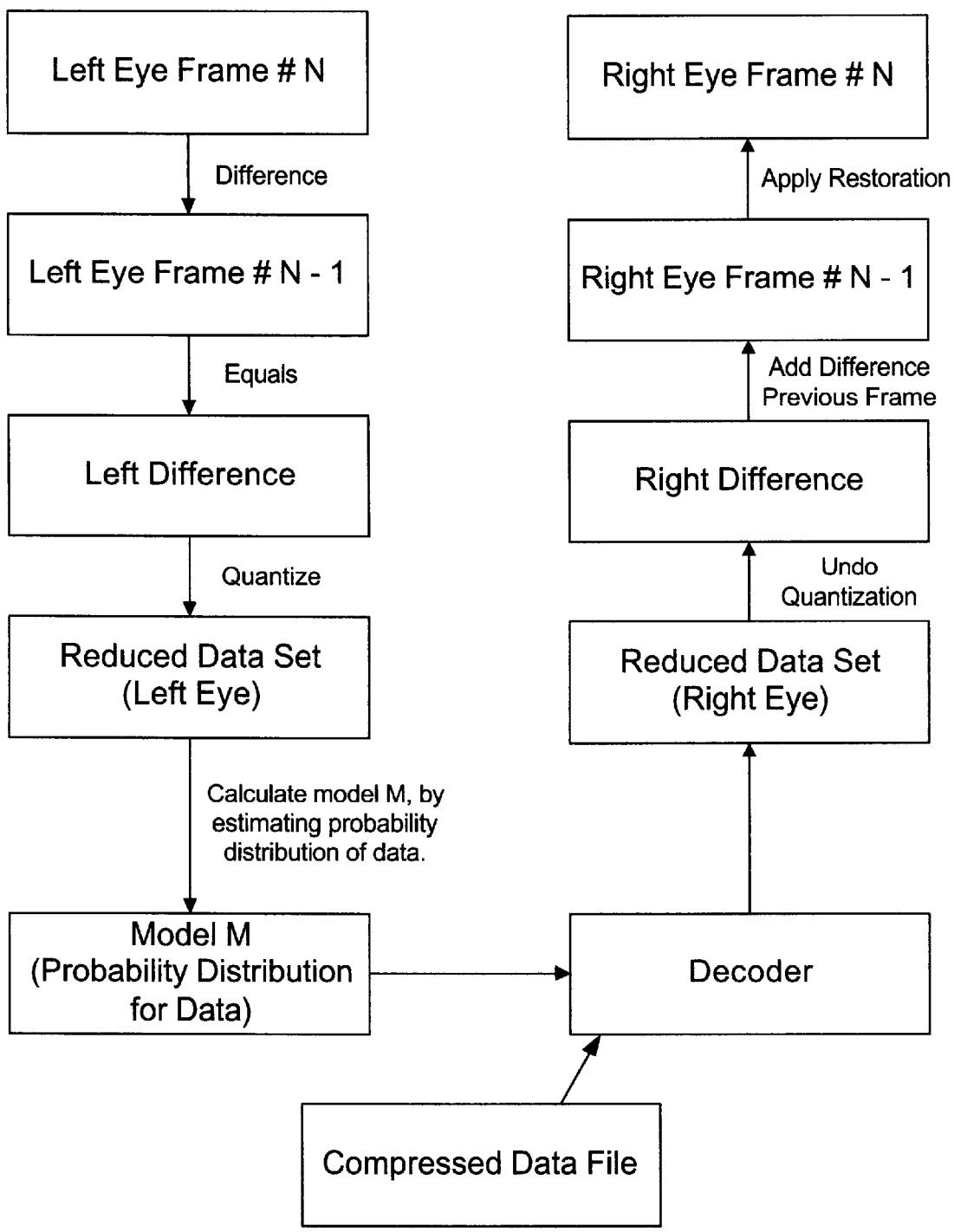
Figure 2: The Decoding Process

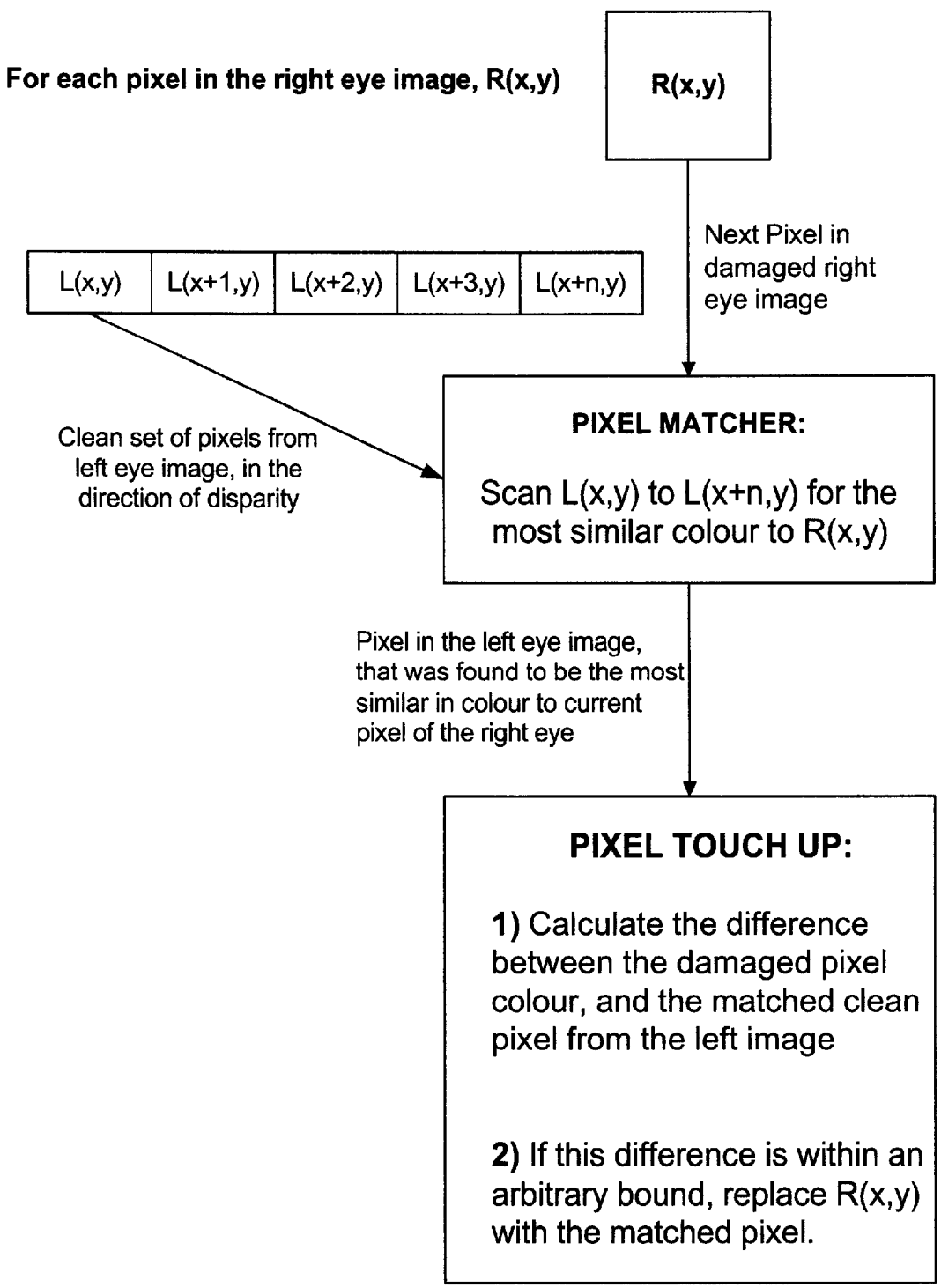
Figure 3: Image Restoration

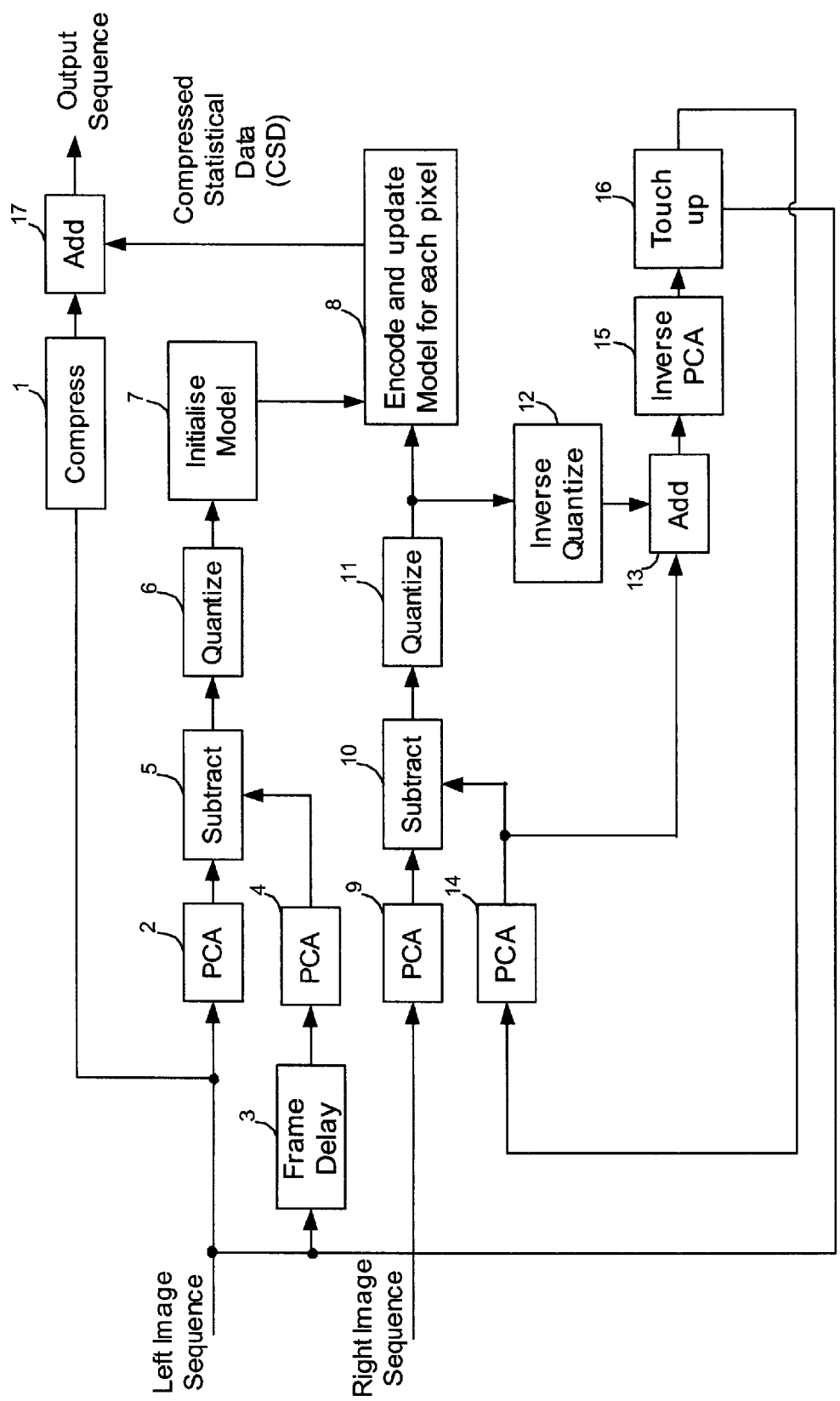
Figure 4: Encoder

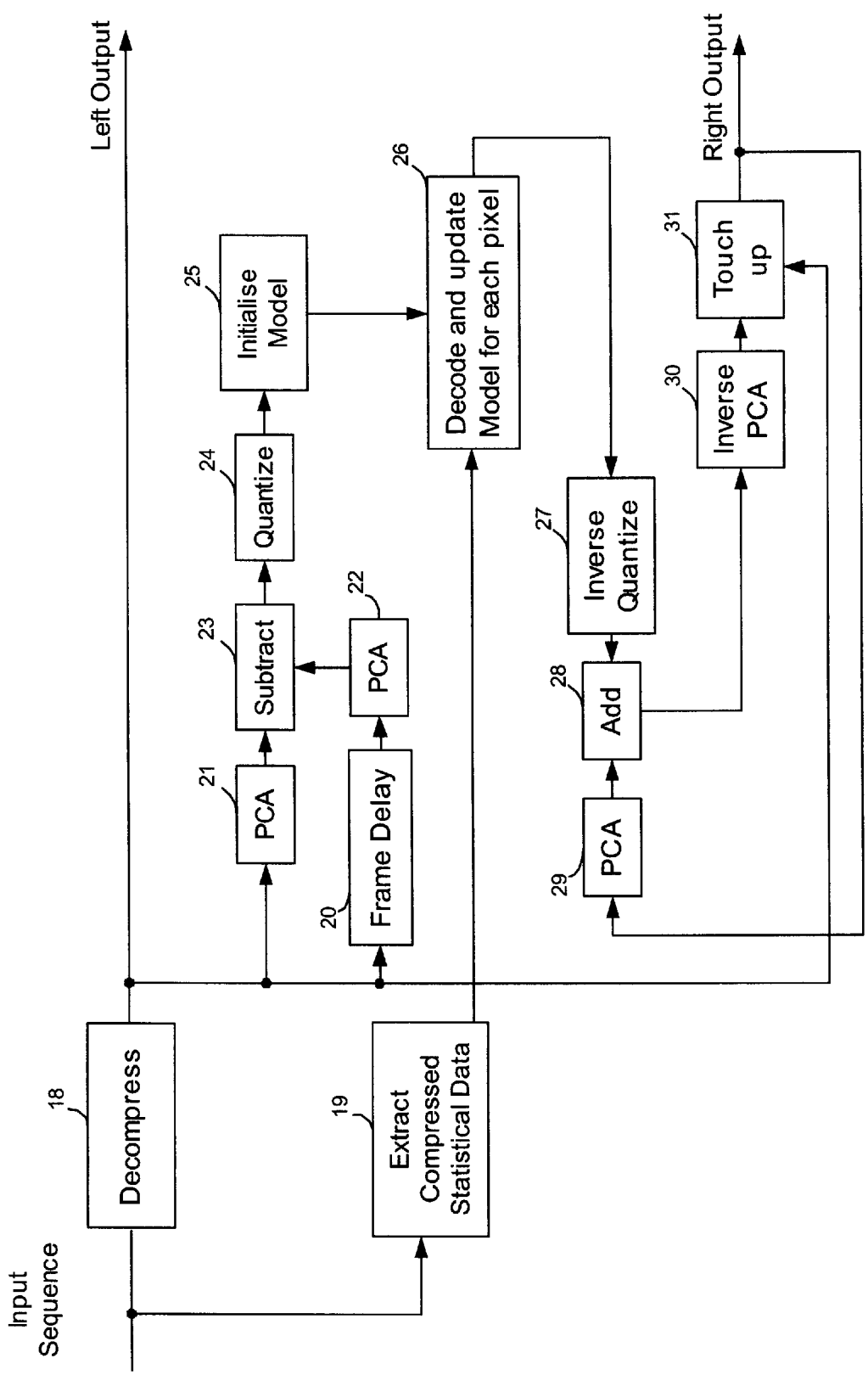
Figure 5: Decoder

IMAGE PROCESSING AND ENCODING TECHNIQUES

FIELD OF INVENTION

The present invention is generally directed towards a process for the compression, encoding, storage and transmission of stereoscopic images that is well suited for real time, or semi real time processing.

BACKGROUND

The efficient transmission, or recording, of stereoscopic images presents a number of problems. Whereas for 2D images a single image, or sequence of images where moving images are presented to the viewer, is presented to both the viewers eyes, for stereoscopic images a different image must be presented to each eye.

The simplest method of providing stereoscopic images is to provide two 2D images to the viewer, that is, a left and right eye image. Ideally these images should be of equal resolution and clarity and, will at worst case, require twice the storage capacity and, for the case where the images are broadcast, twice the transmission bandwidth.

In the past stereoscopic imaging systems have been constructed using two 2D image channels but with the substantial overheads as described above.

The majority of existing 2D image recording and transmission processes have been designed to effectively and efficiently transport 2D images. When stereoscopic or 3D images are transported using 2D mechanisms there are usually a number of compromises that need to be made. These compromises result in a stereoscopic image that is inferior to that obtained by using two 2D mechanisms.

The compromises usually result in the stereoscopic images having one or more of the following characteristics
  (i) The resolution of each of the image pair forming the stereoscopic image is of lower resolution than the equivalent 2D image capacity of the transport mechanism. For example, if the mechanism is a PAL television channel with a 2D resolution of 625 lines then each of the images forming the stereoscopic image may have a resolution of 625/2 lines.
  (ii) There is a temporal delay between the left and right eye images. This causes motion artifacts when objects within the resulting stereoscopic images move.
  (iii) One of the images forming the stereoscopic pair may have a lower resolution than the other, This can prove uncomfortable for some viewers.
  (iv) Artifacts exist in both or either images of the resulting stereoscopic pair that were not present in the original images.

There are a number of techniques that have been attempted by the prior art to address these problems, and used to record and transmit stereoscopic images. Where video storage and transmission is required a popular technique is to transmit the left image in one field of the video frame and the right image in the other. This technique is known as Field Sequential 3D and, whilst it has the advantage of simplicity and compatibility with existing 2D video standards, the resulting stereoscopic images suffer from the compromises described in (i) and (ii) above.

An alternative technique is to split the video frame horizontally and transmit one image in the upper frame and the other in the lower. Again this technique has the advantage of simplicity and compatibility with existing 2D video standards and, although overcoming the problem of temporal delay, still provides images of at best half the resolution of the 2D image.

In order to overcome some of these compromises the prior art has endeavored to take advantage of some of the similarities between the left and right eye images. In this technique one eye is recorded or transmitted at normal resolution and the difference between the left eye and right eye is encoded.

This difference information is transferred to the viewing location along with one of the original images and is provided to the decoder where the stereo image is reconstituted. Typically, to preserve storage medium and bandwidth, the difference between the left and right eyes is compressed using both spatial and temporal techniques.

Unfortunately, simply subtracting the left and right images results in information that contains substantial high frequency components and does not therefore enable high levels of compression to be obtained. Further processing is necessary to reduce the size of the difference information and to obtain very high compression levels, such that the additional information represents in the order of a few percent of the associated, compressed, 2D image. This requires complex and costly hardware, which is often unable to encode the stereoscopic images in real time.

This technique has been applied to MPEG encoded video sequences and is described as part of the Multi-Level Profile standard.

An alternative technique described in the prior art is to make use of the disparity between objects in the stereo pair. A disparity map is produced that indicates the relative distance between identical objects in simultaneously acquired left and right eye images. The disparity map is typically compressed using spatial and temporal compression techniques.

Again this is a non-trivial task since generally an auto-corrolation technique is used to find matching pixels in the stereo pair. This is particularly difficult for areas in the image that have no texture, e.g. a white wall, and where objects are obscured in one eye and not in the other.

OBJECTIVE OF THE INVENTION

It is an objective of the present invention to provide a relatively simple technique for the compression, encoding, storage and transmission of stereoscopic images that is well suited for real time, or semi real time processing.

The technique will ideally enable 2D compatible stereoscopic images to be produced that represent an increase in information size of only a few percent above an optimally compressed 2D image.

SUMMARY OF THE INVENTION

With the above object in mind the present invention provides a method of compressing a stereoscopic image, using entropy coding, wherein a model derived from a first eye image is used to encode an image for a second eye.

It is anticipated that said model will be determined from a first eye difference image of a first frame and a second frame of said first eye image; and that a second eye difference image of a first frame and a second frame of said second eye image, will be encoded.

It will be appreciated that said first frame first eye image should correspond to said first frame second eye image and, similarly, said second frame second eye image should correspond to said second frame second eye image.

In a further aspect, the present invention provides a method of compressing a stereoscopic image including the steps of:

comparing a first frame of a first eye image with a second frame of said first eye image to determine a first difference image;

determining the relative composition of said first difference image to create a first eye model;

comparing a first frame of a second eye image with a second frame of said second eye image to determine a second difference image;

using said first eye model to encode said second difference image.

The relative composition may include a probability distribution of data in said first difference image, Alternatively, the relative composition may include a ranking table of data elements in said first difference image. The data may include red, green and blue values for each pixel.

Conveniently, the first and second frames are consecutive frames of the film or image. The difference value may be determined by comparing the red, green and blue values for each colour pixel. Alternatively, luminance values may also be considered.

The invention is particularly applicable to stereoscopic images in which said first eye image may be compressed as per normal 2D images and said second eye image encoded using the process above. In this scenario it is preferable that the model of the data actually be based on said first eye image and not on said second eye image, to thereby alleviate the need to transmit the model.

The system may preferably be constructed such that each frame of a stereoscopic image is processed as disclosed above. In an alternative embodiment, an adaptive modeling process may be used to alleviate the need to transmit the model, and the model is initialised based on the said first eye frame.

In a further aspect the present invention provides a system incorporating the method above and further including the steps of:

transmitting at least the encoded image; and decoding the difference data to recreate the image.

To further improve compression said first eye difference image and said second eye difference image may be quantized. Where quantisation is used it will be preferable when recreating the encoded image to also includes the step of rebuilding a damaged pixel. This rebuilding may utilise data on the pixels in said first eye image.

In yet a further aspect the present invention provides a hardware encoder to encode stereoscopic images including:

an analysis means to determine the value of pixels in frames of a first eye and a second eye image;

a delay means to enable a first frame of said first eye image and said second eye image to be compared with respective second frame of said first eye image and said second eye image;

a difference means to determine a first eye difference image and a second eye difference image between respective said first and second frames; and an encoder to encode said second eye difference image using a model derived from said first eye difference image.

In the preferred embodiment the analysis means may include a principle component analysis transform. Further, the delay means may include a frame delay, and the difference means may include a subtractor.

The present invention provides an alternative method of stereoscopic image encoding. It is observed that the sequence of left eye images shares great statistical similarity with the sequence of right eye images. Further, it is observed that this similarity is invariant to the spatial disparities between the left and right eye sequences. This similarity represents a redundancy, which the invention exploits to achieve high compression.

To exploit the stereo redundancy, one of the original stereo pairs is recorded or broadcast at normal resolution, and may be compressed using any suitable image compression technique including, though not limited to the MPEG family, Soronson etc. The invention compresses the other stereo channel at a very high rate of compression, by alleviating the need to express that information redundant between the stereo pairs. At the time of viewing, or prior to, the conventionally transmitted half of the stereo pair is decoded. The invention, having this information available, may now decode the highly compressed half of the stereo pair.

The invention may also achieve even greater compression performance, by only partially describing the image stream, for example, the data may be quantised. This type of lossy compression is expected to cause a degradation in the image quality. However, the invention presents a technique whereby the conventionally transmitted half of the stereo pair is used as a template to repair any degradation inflicted in the other, highly compressed, image sequence. In this scenario the system allows the quantisation level to be higher than otherwise would be visually acceptable, resulting in a far higher compression level.

This process as disclosed provides a 2D compatible stereoscopic image system.

BRIEF DESCRIPTION OF THE DRAWINGS

To provide a better understanding of the present invention, reference is made to the accompanying drawings which illustrate a preferred embodiment of the present invention,

IN THE DRAWINGS:

FIG. 1 shows a flow diagram of the encoding process.
FIG. 2 shows a flow diagram of the decoding process.
FIG. 3 shows a flow diagram of the restoration process.
FIG. 4 shows a block diagram of a hardware implementation of the encoding process.
FIG. 5 shows a block diagram of a hardware implementation of the decoding process.

DETAILED DESCRIPTION OF THE INVENTION

In order to exemplify the present invention reference will be made to a preferred embodiment. For convenience, in the preferred embodiment it is assumed that there are two separate image sequences, one for the left eye and one for the right. It is also assumed that these images sequences have been digitized in a manner suitable for processing by a Computer. Such processes will be familiar to those skilled in the art.

For illustrative purposes only it is assumed that the left eye sequence has been previously encoded, at an arbitrary quality, in some way that will be familiar to those skilled in the art. However, it will be understood that the right eye sequence could equally be encoded and the left eye sequence processed using the present invention. Nevertheless, for simplicity it will be assumed that the left eye is processed, forwarded and presented to a viewer using standard techniques, and that the-right eye is to be encoded using the-present invention.

In the preferred embodiment, for each image in the right eye sequence, the encoding technique includes the following steps;

The Encoding Stage

Referring now to FIG. 1, the encoding process of the preferred embodiment of the present invention can be seen.

(1) Preparation of Data

The present invention prepares the compression process, by gathering the data to be encoded, and gathering the corresponding data from the other conventionally encoded image sequence. The steps are:

(1a) Calculate the difference image RightDifference, as the simple difference between the current right eye frame and the previous right eye frame.

(1b) Calculate the difference image LeftDifference, as the simple difference between the corresponding left eye frame and its previous left eye frame.

In determining the difference values the system compares the red, green, and blue (RGB) values for each colour pixel. This difference may be a simple subtraction between the pixels. In an alternative embodiment rather than compare the RGB values, the system could compare a different colour spectrum, luminance values, chrominance values, or any other parameter which would enable the difference to be reliably determined. Conveniently, the difference value may be a numeric value such as a signed integer.

The system compares the images because the resulting image, that is, a set of signed integers, is far less redundant then the original image data, thereby requiring less bandwidth for transmission. This decreased redundancy is brought about as statistically, there is less correlation between samples in the differenced image, and is therefore more compressible.

The system does compare consecutive frames. However, this of course is not strictly possible for the first frame. The system therefore may take a number of options. Firstly, the first frame may be compressed using any standard still frame technique and thereafter the present invention may be employed.

Alternatively, the first frame may be compared with a predefined default screen. For example, a default start screen may be composed of all zeros. In this scenario the differencing step has no effect, and whilst some compression will be achieved, it is unlikely to be as beneficial as subsequent frames.

At any stage the system, in this example, will endeavour to encode the difference between the current frame and the previous frame of the left eye image, a process which has not previously been contemplated.

(2) Lossy Component, Reduction of Data

The invention may achieve even higher compression rates, by discarding a component of the data that is deemed visually acceptable. This step may be: Apply some quantization function Q, to both RightDifference and LeftDifference.

Q reduces the size of the set of possible values that may occur in RightDifference. (3) Exploitation of Redundancy, Model Estimation and Encoding The invention uses a compression paradigm where the compressed data is formed as a two part message. This paradigm is familiar to those skilled in the art. The two parts are:

(a) A model of the data, in the form of probability estimates, and (b) A series of codewords, formed optimally with respect to the model.

Such a model can be referred to as a statistical coding model.

As an example, if we consider that our data to be compressed is a string of symbols, such as letters of the alphabet in a book. Then we would expect the letter "e" to appear more frequently then say the letter "z". Accordingly, the letter "e" may be encoded with a smaller codelength then less frequent letters. Similarly, known combinations may also be given shorter codelengths. For example, it would be expected to find the letter "u" following the letter "q". In this way compression may be achieved by assigning short codewords to high probability symbols. This process of codeword assignment is known as "entropy coding".

The success of the compression will be dependent in part on the accuracy of the probability estimates about the data. This is the task of the statistical coding model, as noted in part (a) above. The model is simply the assignment of a probability to each possible item in the data that is to be compressed. These items can be signed integer values resulting from the differencing of successive images in the film footage. The model is formed by analysing the data to be compressed, and observing the frequency of each item to be compressed. This extends the entropy coding approach to be an adaptive, optimized entropy coding method. It is anticipated that the difference value of zero will be very common due to the similarities of successive frames in films. Hence, the codeword used to encode the occurrence of each zero in the data should be as short as possible.

The total compression output could be the transmission of the codewords, and the model itself. It will be understood that the decoder must have access to the model so that it is able to interpret the codewords. However, transmission of the model can be costly and reduces the compression performance, thereby negating much of the advantage of the present system, The present invention also alleviates the need to transmit the model, thereby making large compression performance savings. This is achieved by exploiting the fact that the left eye footage, which has already been compressed conventionally, is available to both the encoder and decoder at any time. Further, the system knows that the left eye data is very similar to the right eye data.

The encoder of the present invention therefore performs its analysis not on the data to be compressed, that is the right eye footage, but rather the already compressed data of the left eye. The model formed, whilst not perfect, will closely resemble the nature of the right eye data to be compressed.

Therefore in the present system, only the codewords of the right eye footage, based on the left eye model, is transmitted. The decoder having access to the left eye footage may perform the same analysis on the left eye footage and rebuild the model exactly. At which point the decoding stage may take place. That is, the present invention is alleviated of the need to transmit (a), the model of the data. Rather, this model is calculated from the conventionally transmitted stream, LeftDifference.

The requirement of transmitting the model has been circumvented in the past by use of an adaptive modelling process. In this process, both encoder and decoder initially assume the exact same naive model This model knows nothing about the data to come. As each sample is presented to the encoder for compression, the naive model is applied to the task of compressing the sample in the usual manner. After this sample is encoded, the model is updated in the knowledge of the sample just encoded. It is noted that, at the decoding stage, this exact step can be replicated, since the decoder will have just decoded this exact same sample. With the accumulation of more and more observations, the adapted model more accurately resembles the nature of the data set.

The failing of this approach is the initial stages where the model is naive. To achieve high compression, very large models need to be used which require a large number of parameters. Clearly, the larger the model, the more samples that will be required to expose the model to a full representation of the data. Until this occurs, compression performance will be lacking.

The invention applies naturally to this difficulty. The encoder and decoder, having access to the conventionally encoded left eye image, may both use this information to initialise the model. Both the encoder and decoder may run a single pass over the left eye image, and perform the adaptive modelling process across the full set of samples observed in the left eye image, then the right eye encoding, or decoding, process can begin. The model will, in effect, hit the ground running having already been exposed to data statistically similar (ie, the left eye image) to that which it is to encode (ie, the right eye image)

In the compression art, it is not clear whether this adaptive modelling approach is superior to that where the model is transmitted up front with the compression data. Studies have indicated that both processes are roughly equivalent in performance, and are both equally aided by the calculation of the model from the available, statistically similar, left eye image as disclosed by the present invention.

With respect to this model, the data RightDifference may be encoded using some standard entropy coding technique, including though not limited to, Arithmetic Coding, Huffman Coding and Rice Coding.

It is noted that this process of encoding the right eye data is contrary to present teachings in this field. Present applications and teachings of entropy coding require the model for the data to be encoded or compressed to be derived from the same model. That is, to encode or compress an image the model must have been determined from that same image to be compressed. This has previously been understood, as if one model is derived from different data, or a different image, the allocation of codewords would not be optimum, and therefore the desired compression would not be achieved.

The present invention goes against this teaching, by not deriving the model from the image to be encoded. Rather, the present invention creates a model using the left eye image, and then encodes the right eye image using the left eye model. It will be understood that by the very nature of stereoscopic images, the left and right eye images are spatially different, however exhibit high statistical similarity. Hence the unconventional process adopted by the present invention.

The Decoding Stage

Referring now to FIG. 2, in the preferred embodiment of the present invention, for each image in the right eye sequence, the decoding technique may include the following steps:

(1) Preparation of Data

Note again, that for illustrative purposes, the left eye image sequence may be previously decoded by conventional means.

To reverse the compression process, the invention prepares data in the following way:

Calculate difference image LeftDifference, as the simple difference between the corresponding left eye frame and its previous left eye frame. This process must be the same process as that used in the encoding stage.

(2) Lossy Component, Reduction of Data

The invention applies the exact same data reduction process Q, as described in section 2 of the encoding process. The result is a data set with a reduced set of possible values, which is still named LeftDifference. Again it is necessary for both the encoder and decoder to know the reduction process in advance, and whilst it is possible to adopt various data reduction processes, and that these processes may adapt to changes in the data, it is important that the decoder knows in advance what technique was used by the encoder.

(3) Calculating the Model

Using the exact same model estimation process as in the encoding stage, the invention estimates the model for the data LeftDifference by estimating the probability distribution. As for the encoder, the decoder may estimate the model for the data LeftDifference by observing the frequency distribution of the data. This frequency information provides an estimate of the underlying probability distribution, which may then be utilised to assign the codewords.

(4) Decoding RightDifference

Given the model from (3), the invention reverses the standard entropy coding technique described in (3, encoding stage). The result is the set of data RightDifference. The entropy coding technique is fully reversible in that given the string of codewords, and the exact same model used to encode the data, then the original data can be accurately decoded.

(5) De-Quantization of RightDifference

The lossy component, in the form of function Q, as in step (2), is reversed. The result is a set of data that approximates RightDifference.

(6) Restoration of Original Right Eye Image

With an approximation of the data RightDifference, and the previously decoded right eye frame, the invention re-constructs the original right eye frame. That is, the present system utilises the previous frame to reconstruct the present frame. Again, with regard to the initial frame it is important that the decoder and encoder behave in the same manner. That is, if the encoder encodes the first frame by comparison with a frame of zeros, then the decoder must decode the frame on the same basis.

Because of the lossy component, in the form of quantization process Q, the resulting right eye image may suffer degradation in quality.

The invention provides a process where this degradation may be repaired, by scanning the corresponding left eye image in the damaged areas. This process is described with these steps:

(6.1) The system may assume that every pixel in the right eye image is damaged, and accordingly selects the next pixel.

(6.2) The system scans the left eye image by looking in the direction of the expected disparity. This scan is conducted for a length of pixels which is the largest estimated disparity between the left and right eye images. The direction of expected disparity, and largest estimated disparity are estimated in advance based on prior knowledge of the stereo footage.

(6.3) The system finds the colour in this scan that most closely matches the damaged pixel. This match is performed by comparing red, green and blue values of the pixels. The calculation of similarity may include, but is not limited to, the Euclidean distance or Mahalanobis distance of pixel values in RGB colour space.

(6.4) The system sets the colour of the damaged pixel to this colour if, and only if, the new colour improves the image quality. To determine whether image quality is improved, the system considers the total possible distortion to the damaged pixel's red, green and blue values that may have been introduced by the quantization data reduction process. If the improvement that the system attempts through this "touch up" process represents a greater distortion, then it is deemed to be counter-productive, and the damaged pixel remains unchanged. To compare distortion levels between two colour pixel values, the system again may use measurements such as Euclidean distance or Mahalanobis distance of pixel values in RGB colour space.

This decoding process is illustrated as a flow chart in FIG. 2.

The restoration process of (6) above is illustrated as a flow chart in FIG. 3.

To summarise, the present invention includes the following stages;

(1) Determine the difference between the current frame and the previous frame for the left eye.

$$Lf_1 - Lf_2 = Lf_3$$

(2) Determine a model of the difference image $Lf_3$ for example a table ranking the "frequency" of differing pixels.

(3) Determine difference between the current frame and a previous frame for the right eye image $$Rf_1 - Rf_2 = Rf_3$$

(4) Encode $Rf_3$ using the model of $Lf_3$.

This encoded image may then be stored for future use, or transmitted to a user. On receiving the encoded data, the reverse process is used to reconstitute the right eye image.

It should be noted that in creating the model, and the encoded data, regard may also be had for adjacent pixels. That is, rather than analyse and encode only a single pixel, reference is had to adjacent and/or surrounding pixels. If we again return to our example of the text, it would be understood that the letter Q of itself may not occur often in a standard piece of text. However, it will also be appreciated that in the English language, if a letter Q is present, there is a very high probability that the next character will be the letter U. Accordingly, if the system did consider adjacent characters, better compression may be achieved. Similarly, the present system may wish to consider adjacent, or surrounding pixels, to enhance compression. Further, in determining the difference images, the system may break down each pixel value into difference values for the red, green, and blue elements separately. Alternatively, a single value may be adopted.

It is noted that the transmission of left and right eye images to achieve stereoscopic viewing does create transmission problems. However, the present invention takes advantage of this dual eye transmission. The present invention allows one of the eye images, in this example the left eye, to be processed and transmitted as would be the case for any normal 2D image. The invention then processes the right eye as disclosed above, and adds this additional data to the transmission. This additional data results in only a relatively small increase in the data to be transmitted, and certainly achieves much greater accuracy at high compression rates than presently available systems. Further, it is noted that by not needing to transmit the model from which the image was encoded, further savings are made. That is, present teachings with the use of entropy coding require the model and the encoded data to be transmitted together. The present invention utilises the left and right eye images to avoid the necessity to transmit the model.

In the preferred embodiment, the difference images are quantized to gain further compression. However, in some systems it may be preferred not to include any quantisation.

In such a system, it should not be necessary to repair or touch up the pixels from the reconstituted image. Further, if quantisation is included, the degree of quantisation will be dependent on the system parameters. Depending on this degree of quantisation, and the desired results, the step of repair or touch up may or may not be included.

It will also be appreciated that the transmission of the right eye encoded data need not be simultaneous with the transmission of the normal left eye data. For example, the right eye encoded data may be made available over the Internet for users to download. Following download of such data, the user may then be able to combine this data when the left eye data is transmitted.

In some implementations where the images are of a known or similar type, it may be preferable to use a predetermined look-up table to create the model.

It is noted in the preceding description that the left eye image was compressed and that the right eye image was then compared and compressed using the techniques of the present invention. It will be understood that the present invention would also be applicable to right eye images. That is, the right eye images may be compressed and transmitted as per 2D signals, and the left eye images (using a model based on the right eye) may be compared and compressed using the present invention. Accordingly, references to analysis of the right eye should not be seen as precluding similar working of the invention with respect to the left eye.

Whilst the present invention is of particular relevance to stereoscopic film, it is also applicable to still images. Referring again to FIG. 1, where the boxes labelled:

Left Eye Frame # N-1 and
Right Eye Frame # N-1
are generalised to be
Left Eye Predicted Image
Right Eye Predicted Image
such that the "Predicted Image" is calculated as:
(a) for film footage
Frame # N-1 (left or right eye)
(b) for still footage
any standard linear predictive coding (LPC) technique which are understood in image compression. Such a technique may scan the image one pixel at a time, using previously observed pixels to predict the next pixel. The result is an image which is a prediction of itself. When subtracted in the boxes:
Left Difference and
Right Difference
the resulting data will have far less complexity, and be more compressible (as is exactly the intention of (a) in the film footage case. That is, still images may be processed in the same way as film footage.

HARDWARE EMBODIMENT

It will be appreciated that the preceding process is well suited to fully automatic implementation in either hardware, software or a combination of both. This would enable live stereoscopic images, captured from a suitable device, to be converted and encoded in CSD (compressed statistical data) format in real time for subsequent broadcasting or recording.

A block diagram of the preferred embodiment of a hardware encoder is shown in FIG. 4. For illustrative purposes only it will be assumed that the left eye image sequence is to be transmitted intact and the right eye sequence will be reconstituted from the left eye. This operates as follows.

The incoming left eye image sequence is applied to the video compressor (1) which for example may be an MPEG or Soronson compressor. It is also applied to a Principle Component Analysis (PCA) transform (2) which is a method of reducing the red, green and blue values of a pixel to a single value that is easier to handle, Whilst the pixel luminance could be used this is not preferred as very different colours may have similar luminances and a Frame Delay (3). The frame delay may be used to provide the previous image so that the difference between the current and previous image may be calculated. An example of a suitable Principle Component Analysis transform is a Karhunen-Loeve transform, other suitable transforms will be know to those skilled in the art. The output from the Frame Delay is applied to a PCA transform (4) and thence to Subtractor (5) the output of which is the difference between the current and previous images. This difference sequence is fed to Quantizer (6) and thence to the Initialise Model function (7). The output from the Initalise Model function is used to initialise the Encode and Update function (8).

The incoming right eye image sequence is applied to a PCA transform (9) the output of which is passed to a Subtractor (10). The output of the Subtractor is input to the Quantizer (11) and thence to the Encode and Update function (8). The output of the Quantizer (11) is also fed to the input of the Inverse Quantize function (12) and thence to the input of Adder (13). The output of the Adder is applied to an Inverse PCA function (15) and thence to the Touch Up function (16). The output of the Touch Up function is fed back to the PCA transform (14) which effectively provides the previous right eye image sequence to the Subtractor (10).

The output from the Encode and Update function (8), which is the Compressed Statistical Data (CSD), is added to the output of the compressed left eye image sequence from Compressor (1) in Adder (17) and forms the output sequence.

A block diagram of the preferred embodiment of a hardware decoder is shown in FIG. 5. For illustrative purposes only it will be assumed that the left eye image sequence has been transmitted intact and the right eye sequence will be reconstituted from the left eye. This operates as follows.

The incoming image sequence, containing the compressed left eye sequence plus Compressed Statistical Data, is applied to Decompressor (18) which provides the left eye image sequence as its output.

The decompressed left eye image sequence is applied to the input of the PCA transform (21) and thence to Subtractor (23). The decompressed image sequence is also applied to Frame Delay (20) and subsequently to PCA transform (22). The output of Subtractor (23), the output of which is the difference between the current and previous images, is then applied to Quantizer (24). The output of the Quantizer (24) is used as input to the Initialise Model function (25) and thence to the Decode and Update Model function (26).

The input sequence is also applied to CSD Extractor (19) that recovers the CSD data from the incoming image sequence. The CSD is applied as one input of the Decode and Update Model function (26). The output of the Update Model function (26) is fed to Inverse Quantizer (27) and thence to Adder (28). The output of the Adder (28) is passed to the Inverse PCA function (30) and thence to Touch Up function (31). The output of the Touch Up function represents the reconstituted right eye image sequence. The output from the Touch Up function is also applied as input to the PCA function (29) and hence to Adder (28).

It will be obvious to those skilled in the art that the decoder process could be implemented in hardware or software e.g. on a PC as either a stand-alone program or integrated into popular imaging software such as Apple QuickTime.

It will also be appreciated that in order to ensure synchronization between the CSD data and the associated 2D image it is desirable that CSD data should be embedded in the original compressed 2D image. A number of image compression processes make provision for the inclusion of such data, for example the MPEG 2 standard allows private or user data to be transferred along with the compressed image signal.

Whist embedding the CSD in the 2D image data is desirable it is by no means essential for the efficient implementation of this disclosure. Since the CSD data is of low bandwidth, and hence can be encoded at low bit rate, it may be transferred to the viewing location either in synchronism with the 2D image or prior to the decoding.

The CSD data may be recorded or transmitted via an entirely different medium and separate to the 2D image. The CSD data may also be pre-recorded at the viewing location and presented to the decoder in real time as the 2D image is receive. The stereoscopic image, resulting for applying the CSD data to the 2D image may be generated in real time or recorded for future viewing.

For illustrative purposes only, the CSD data could be downloaded from the Internet, provided on a floppy disk or CD-ROM, in volatile or non-volatile ROM or RAM or other storage technology familiar to those skilled in the art.

The CSD data may also be encrypted or otherwise protected prior to recording or transmission.

In summary, the present invention provides a method of compressing a stereoscopic image pair. The invention exploits the observation that the right image and left image in a stereoscopic pair exhibit high statistical redundancy. Further, the invention exploits the fact that this statistical redundancy exists, despite the spatial disparities between the right and left images.

The compression technique from which the present system has been developed requires the formation of a model of the data to be compressed. This model represents an understanding of the data. The model is typically created by analysing the data set prior to compression. Using this understanding of the data, a coding scheme can then be designed which is optimised to the nature of the data to be compressed. This coding scheme is then applied to the data to produce a final compressed output.

In the compression art, there are two broad areas which may employ the above approach, being dictionary coders, such as, but not limited to, the Lempel Ziv family of algorithms, and the entropy coders such as, but not limited to, Arithmetic and Huffman coding. The preferred embodiment of the invention uses the entropy coder approach, though need not be thus restricted.

The compression performance that is achieved depends on the quality of the model, and its ability to express the nature of the data to be compressed. The model may be of arbitrary complexity, and may use an arbitrarily large number of parameters to represent an understanding of the data to be compressed. However, the final compressed output must be accompanied with a representation of the model. Otherwise, it is not possible to decode the compressed output. Hence, an overly large model may lead to greater compression performance, only to give up any gains due to the required transmission of its many parameters.

The present system introduces an innovation to relieve this problem. The requirement of transmitting the model is removed, thus allowing the model to be of arbitrary complexity. Two savings in compression are achieved. Firstly, the model is not required to be transmitted, thus reducing the overall length of the final output. Secondly, the model can be arbitrarily large and thus more accurately represent the data, resulting in a more optimised coding scheme. This results in a more compressed final output.

To summarise this innovation, a convention is adopted whereby it is assumed that one of the stereo images is to be compressed by conventional means, such as, but not restricted to, the JPEG process. For example, we will assume that this is the left eye image of the stereo pair. The system then seeks to compress the right eye image of the stereo pair at a far higher level of compression. It will be appreciated that this arrangement may be reversed, such that the right eye image is to be compressed by conventional means, and the left to be compressed by the present system, without loss of generality.

In the preferred embodiment of the invention, it is assumed that at both the time of compression and decompression of the right eye image, that the left eye image data is available. This assumption is fair, given that the left eye image may have been handled by conventional means such as, but not restricted to, the JPEG process.

The invention seeks to achieve very high compression on the right eye image. In the preferred embodiment, the entropy coding technique described above is applied. The innovation lies in using a very large and complex model of the right eye image data, which has been estimated by analysing the left eye data, to facilitate high compression. The innovation, however, does not perform modelling on the right eye image, but instead the already handled left eye image. At the decompression stage, the left eye image data is anticipated to be readily available to perform the exact same model analysis. Thus, there is no longer a requirement to transmit the model, given that both compressor and decompressor have access to the exact same information, that being the left eye image.

By nature of the stereoscopic imagery, it is expected that both right and left eye images will be statistically very similar. Hence, a model determined from the left eye image is expected to be similar to the corresponding model determined from the right eye image. The model calculated from the left image, is then used to design a coding system that is applied to the right eye image. While it is conceded that the model will lose some accuracy due to being derived from the left eye image, it is expected that this accuracy is far more than compensated by the alleviation of its transmission requirement, and the resulting freedom in complexity that results.

Whilst the method and apparatus of the present invention has been summarised and explained by illustrative examples, it will be appreciated by those skilled in the art that many widely varying embodiments and applications are within the teaching and scope of the present invention, and that the examples presented herein are by way of illustration only and should not be construed as limiting the scope of this invention.

The claims defining the invention are as follow:

1. A method of compressing a stereoscopic image, using adaptive optimized entropy coding, wherein a statistical coding model derived from a first eye image is used to encode an image for a second eye.

2. The method as claimed in claim 1, including determining said statistical coding model from a first eye difference image of a first frame and a second frame of said first eye image; and encoding a second eye difference image of a first frame and a second frame of said second eye image using said statistical coding model.

3. The method as claimed in claim 2, wherein said first and second frames are consecutive frames of said stereoscopic image.

4. The method as claimed in claim 2, including determining a difference value of said difference image by comparing red, green and blue values for each color pixel.

5. The method as claimed in claim 2, including determining a difference value of said difference image by comparing luminance values for each pixel.

6. A method of transmitting a stereoscopic image including compressing said second eye image by the method as claimed in claim 1.

7. The method as claimed in claim 6, including transmitting said first eye statistical coding model with the compressed second eye image.

8. A method for receiving stereoscopic images including compressing said second eye image using the method as claimed in claim 1; and determining the first eye statistical coding model from received first eye images to enable said second eye image to be decompressed.

9. A method incorporating the method as claimed in claim 1, and further including:
transmitting at least the encoded image; and
decoding difference data to recreate the image.

10. The method as claimed in claim 9, wherein the difference data includes first and second eye difference images, said method further including quantizing said first eye difference image and said second eye difference image.

11. The method as claimed in claim 9, further including rebuilding each damaged pixel.

12. The method as claimed in claim 10, further including rebuilding each damaged pixel.

13. The method as claimed in claim 11, wherein said rebuilding includes comparing each damaged pixel to a corresponding pixel in said first eye image.

14. The method as claimed in claim 12, wherein said rebuilding includes comparing each damaged pixel to a corresponding pixel in said first eye image.

15. A method of compressing a stereoscopic image including the steps of:
comparing a first frame of a first eye image with a second frame of said first eye image to determine a first difference image;
determining the relative composition of said first difference image to create a first eye model;
comparing a first frame of a second eye image with a second frame of said second eye image to determine a second difference image;
using said first eye model to encode said second difference image.

16. The method as claimed in claim 15, wherein the relative composition includes a probability distribution of data in said first difference image.

17. The method as claimed in claim 15, wherein the relative composition includes a ranking table of data elements in said first difference image.

18. The method as claimed in claim 16, wherein said data includes red, green and blue values for each pixel.

19. The method as claimed in claim 17, wherein said data includes red, green and blue values for each pixel.

20. The method as claimed in claim 15, wherein said first and second frames are consecutive frames of said stereoscopic image.

21. The method as claimed in claim 15, including determining said first and second difference images by comparing red, green and blue values for each color pixel.

22. The method as claimed in claim 15, including determining said first and second difference images are by comparing luminance values for each pixel.

23. A method of transmitting a stereoscopic image including compressing said second eye image by the method as claimed in claim 15.

24. The method as claimed in claim 23, including transmitting said first eye model with the compressed second eye image.

25. A method for receiving stereoscopic images including compressing said second eye image using the method as claimed in claim 15; and determining the first eye model from received first eye images to enable said second eye image to be decompressed.

26. A method incorporating the method as claimed in claim 15, and further including the steps of:
- transmitting at least the encoded second difference image; and
- decoding the encoded second difference image to recreate the second difference image.

27. The method as claimed in claim 26, including quantizing said first eye difference image and said second eye difference image.

28. The method as claimed in claim 26, further including rebuilding each damaged pixel.

29. The method as claimed in claim 27, further including rebuilding each damaged pixel.

30. The method as claimed in claim 28, wherein said step of rebuilding includes comparing each damaged pixel to a corresponding pixel in said first eye image.

31. The method as claimed in claim 29, wherein said rebuilding includes comparing each damaged pixel to a corresponding pixel in said first eye image.

32. A hardware encoder to encode stereoscopic images including:
- an analysis means to determine a value of pixels in frames of a first eye and a second eye image;
- a delay means to enable a first frame of said first eye image and said second eye image to be compared with a respective second frame of said first eye image and said second eye image;
- a difference means to determine a first eye difference image and a second eye difference image between respective said first and second frames; and
- an encoder to encode said second eye difference image using a model derived from said first eye difference image.

33. The hardware encoder as claimed in claim 32, wherein said analysis means includes a principle component analysis transform.

34. The hardware encoder as claimed in claim 32, wherein said delay means includes a frame delay, and said difference means includes a subtractor.

35. A method of compressing a stereoscopic image comprising:
- deriving a statistical coding model from a first eye image; and
- performing adaptive optimized entropy encoding on a second eye image using said statistical coding model.

36. The method as claimed in claim 35, further comprising:
- determining said statistical coding model from a first eye difference image of a first frame and a second frame of said first eye image; and
- encoding a second eye difference image of a first frame and a second frame of said second eye image using said statistical coding model.

37. An apparatus for encoding stereoscopic images including:
- an analysis module configured to determine values of pixels in frames of a first eye and a second eye image;
- a frame delay configured to enable a first frame of said first eye image and said second eye image to be compared with a respective second frame of said first eye image and said second eye image;
- a subtractor configured to determine a first eye difference image and a second eye difference image between respective said first and second frames; and
- an encoder configured to encode said second eye difference image using a model derived from said first eye difference image.

* * * * *